(12) United States Patent
Seth (10) Patent No.: US 9,670,080 B2
(45) Date of Patent: Jun. 6, 2017

(54) COMPOSITION AND METHOD FOR TREATING OILFIELD WATER

(71) Applicant: Kushal Seth, Houston, TX (US)

(72) Inventor: Kushal Seth, Houston, TX (US)

(73) Assignee: BAKER HUGHES INCORPORATED, Houston, TX (US)

(*) Notice: Subject to any disclaimer, the term of this patent is extended or adjusted under 35 U.S.C. 154(b) by 474 days.

(21) Appl. No.: 13/924,801

(22) Filed: Jun. 24, 2013

(65) Prior Publication Data

US 2014/0374104 A1    Dec. 25, 2014

(51) Int. Cl.
*C02F 1/72* (2006.01)
*E21B 43/40* (2006.01)
(Continued)

(52) U.S. Cl.
CPC .............. *C02F 1/725* (2013.01); *E21B 43/40* (2013.01); *C02F 1/52* (2013.01); *C02F 1/766* (2013.01); *C02F 2103/10* (2013.01)

(58) Field of Classification Search
CPC ........ C02F 1/72; C02F 1/52; C02F 2101/101; C02F 1/725; C02F 2103/10; C02F 1/281;
(Continued)

(56) References Cited

U.S. PATENT DOCUMENTS 3,186,942 A * 6/1965 Benger .................... B01J 27/06
210/763
4,363,215 A * 12/1982 Sharp ...................... B01D 53/00
210/759
(Continued)

FOREIGN PATENT DOCUMENTS

CA    1269183 A    5/1990
CA    1333103 C    11/1994

OTHER PUBLICATIONS

Santo et al. Optimization of coagulation-flocculation and flotation parameters for the treatment of a petroleum refinery effluent from a Portuguese plant, Chem. Engr'g, 183 (2012) 117-123.*
(Continued)

*Primary Examiner* — David C Mellon
*Assistant Examiner* — Liam Royce
(74) *Attorney, Agent, or Firm* — Cantor Colburn LLP (57) ABSTRACT

A method for reducing sulfide in oilfield waste water includes contacting oilfield waste water with an oxidizer in the presence of an iron catalyst. The oilfield waste water includes sulfide that is oxidized to sulfate while avoiding formation of a colloidal or bulk sulfur precipitate. A method for recycling oilfield waste water includes contacting oilfield waste water with an oxidizer in the presence of an iron catalyst, the oilfield waste water comprising sulfide; oxidizing the sulfide to sulfate; avoiding formation of a colloidal sulfur precipitate, a bulk sulfur precipitate, or a combination comprising at least one of the foregoing; clarifying the oilfield waste water by contacting the oilfield waste water with a flocculant to form an aggregate precipitate; separating the aggregate precipitate from the oilfield waste water to form a recycled water; combining an additive with the recycled water; and disposing the recycled water in a downhole environment.

19 Claims, 3 Drawing Sheets

(51) Int. Cl.
*C02F 1/76* (2006.01)
*C02F 1/52* (2006.01)
*C02F 103/10* (2006.01)

(58) Field of Classification Search
CPC .. C02F 1/722; C02F 1/727; C02F 1/76; C02F 1/78; C02F 1/5236; C02F 1/5245; C02F 1/5272; C02F 9/00; C02F 2101/40; C02F 2305/02; C02F 2209/26; C02F 2103/365; C02F 1/766; E21B 43/40; E21B 21/06; E21B 21/063; E21B 21/065; E21B 21/068; E21B 43/34; B01J 20/3236; B01J 20/06
See application file for complete search history.

(56) References Cited

U.S. PATENT DOCUMENTS

| | | | |
|---|---|---|---|
| 6,235,204 B1* | 5/2001 | Castaldi | C02F 9/00 210/719 |
| 7,846,408 B1* | 12/2010 | Cox, Jr. | C02F 1/725 423/244.01 |
| 2003/0209499 A1* | 11/2003 | Haase | C02F 1/50 210/728 |
| 2011/0017677 A1* | 1/2011 | Evans | C02F 1/5236 210/708 |
| 2012/0118804 A1* | 5/2012 | Matza | B01J 20/06 210/195.1 |

OTHER PUBLICATIONS

Bruce E. Roberts, SPE, Shell Canada Ltd., "The Effect of Sulfur Deposition on Gaswell Inflow Performance", SPE Reservoir Engineering, May 1997, pp. 6.
Hach, Model HS-C #25378-00 Hydrogen Sulfide Test Kit 0-5 mg/L as Hydrogen Sulfide, © Hach Company, 2000. All rights reserved. Printed in the U.S.A., 6 pages.
Fadairo Adesina et al., "Elemental Sulphur Induced Formation Damage Management in Gas Reservoir", SPE 154980, 2012, 7 pages.
Nicholas Hands et al., "Advances in the Prediction and Management of Elemental Sulfur Deposition Associated with Sour Gas Production from Fractured Carbonate Reservoirs", SPE 77332, 2002, 18 pages.
A.R. Ramachandra Kamath et al., "Sour Gas Development—Technical and Operational Integrity Issues and Management", SPE 88754, 2004, 5 pages.
Canadian Office Action; Canadian Application No. 2,851,015; Date of Mailing: Jul. 7, 2015; 4 pages.

* cited by examiner

Sample 3 (before treatment)     Sample 3 (after treatment)

FIG. 3

Sample A     Sample B     Sample C

COMPOSITION AND METHOD FOR TREATING OILFIELD WATER

BACKGROUND

Industrial, commercial, and residential use of water typically adulterates the water by addition of contaminating substances. In residential systems, a common adulterant is spent laundry detergent, which contains large amounts of sulfates. In commercial and industrial settings, water is used as a coolant, drainage agent, dilution compound, solvent, and the like. A particular use of water in some commercial environments involves power washing of objects such as sidewalks and buildings. Additionally, even if not involved directly in operations, water can become part of industrial settings as in mining where pools of water collect in shafts, abandoned mine tunnels, open mine strips, and similar features. These pools of water collect vast amounts of minerals and acids. A common issue with each area of use is the accumulation of hard water ions, e.g., divalent alkali metals. Water treatment can be costly and time consuming and does not always reduce contaminants in the water below a level such that the water is suitable for reuse.

Water also is used for stimulation of hydrocarbon and natural gas wells as well as in hydraulic fracturing. Recently, hydraulic fracturing has dramatically increased the amount of hydrocarbon production. Large volumes of fresh water injection coupled with water conservation efforts have increased an emphasis on oilfield water management such as water reuse. However, reuse of oilfield waste water poses a challenge to the industry.

Used oilfield water typically contains hydrogen sulfide. Removal of the hydrogen sulfide is warranted if the waste water is to be reused because hydrogen sulfide is corrosive, toxic, and flammable. Attempts to remove hydrogen sulfide from water include sulfide ion complexation, aeration, and stripping. If the water contains a precipitate, its reuse is limited because precipitates plug pore throats and damage formations.

The development of processes and systems that can be used to treat water and decrease hydrogen sulfide in the water is very desirable.

BRIEF DESCRIPTION

The above and other deficiencies are overcome by, in an embodiment, a method for reducing sulfide in oilfield waste water, the method comprising: contacting oilfield waste water with an oxidizer in the presence of an iron catalyst, the oilfield waste water comprising sulfide; oxidizing the sulfide to sulfate; and avoiding formation of a colloidal or bulk sulfur precipitate.

In an additional embodiment, a method for recycling oilfield waste water comprises: contacting oilfield waste water with an oxidizer in the presence of an iron catalyst, the oilfield waste water comprising sulfide; oxidizing the sulfide to sulfate; avoiding formation of a colloidal sulfur precipitate, a bulk sulfur precipitate, or a combination comprising at least one of the foregoing; clarifying the oilfield waste water by contacting the oilfield waste water with a flocculant to form an aggregate precipitate; separating the aggregate precipitate from the oilfield waste water to form a recycled water; combining an additive with the recycled water; and disposing the recycled water in a downhole environment.

In a further embodiment, a composition comprises: oilfield waste water; an oxidizer; and an iron catalyst.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that an oxidizer and catalyst described herein treats oilfield waste water having a high sulfide content without formation of colloidal or bulk sulfur precipitates. The oxidizer and catalyst efficiently convert sulfide to sulfate in the aqueous solution for high and low amounts of sulfide in the water. Produced water and flowback water having high H2S content and treated with the oxidizer and catalyst do not form colloidal precipitates. Thus, the produced water and flowback water is reused as a hydraulic fracturing fluid or in enhanced oil recovery applications. Moreover, the methodology is simple and low cost for the removal of the hydrogen sulfide from natural gas or liquid streams without formation of colloidal or bulk sulfur precipitates.

Furthermore, the oxidation chemistry presented involves a green chemical oxidizer (e.g., chlorine dioxide) and also is amenable to various other oxidizers for hydrogen sulfide mitigation. Ordinarily some oxidizers such as chlorine dioxide oxidize sulfide elemental sulfur that appears as a precipitate, e.g., a colloidal or bulk precipitate.

Oxidants such as chlorine dioxide have a complex chemistry with $H_2S$. Changes in the concentration of the oxidizer or hydrogen sulfide or pH alter the reaction end products. Moreover, the oxidation products depend on the oxidation state of the constituent atoms in the oxidizer (e.g., chlorine) and sulfur in the reactants. Exemplary reactions between oxidizer and hydrogen sulfide include:

$$H_2S + ClO_2 \rightarrow HCl + H_2SO4 + S^0$$

$$H_2S + ClO_2 + NaOH \rightarrow H_2SO4 + NaCl + HCl$$

$$H_2S + HClO_2 \rightarrow H_2SO_4 + HCl + H_2O.$$

The iron catalyst herein avoids or prevents formation of elemental sulfur, which is difficult and time-intensive to separate from the liquid. In the context of reuse of water, such precipitate causes formation damage if water containing sulfur precipitates is used for hydraulic fracturing. Damage includes blocking pore throats. Addition of the iron catalyst during oxidation reactions of $H_2S$ reduces or eliminates sulfur precipitate formation by converting the sulfide to sulfate.

In an embodiment, a method for reducing sulfide in oilfield waste water includes contacting oilfield waste water with an oxidizer in the presence of an iron catalyst. The oilfield waste water contains sulfide, which is oxidized to sulfate while avoiding formation of a colloidal sulfur precipitate, a bulk sulfur precipitate, or a combination comprising at least one of the foregoing. Such precipitate formation occurs from oxidizing the sulfide or an oxidation product of the sulfide. According to an embodiment, the sulfide present in the oilfield waste water is eliminated or quantitatively oxidized into a soluble, non-precipitating sulfur ion or compound, specifically sulfate. It is contemplated that certain cations present cause sulfate precipitation in an amount that depends, e.g., on pH. In an embodiment, a polyvalent ion (e.g., a divalent alkaline earth metal such as $Ca^{2+}$, $Sr^{2+}$, $Ba^{2+}$, and the like) is present such that the sulfate solubility depends on the pH or the solubility product constant of the particular sulfate compound (e.g., $CaSO_4$). Therefore, the pH is controlled in some embodiments to ensure that the sulfate produced by oxidation of the sulfide remains soluble. In one embodiment, the amount of such polyvalent ions is controlled generally or selectively (such as by ionic species) to decrease an amount of a polyvalent ion that would cause sulfate precipitation. The polyvalent ion is, e.g., sequestered, complexed, or reacted by a reagent.

It is contemplated that the colloidal or bulk precipitate includes elemental sulfur, which, in some instances is covalently bonded to other atomic species. Colloidal precipitates are difficult to remove from liquids, and the method herein advantageously avoids formation of a colloidal precipitate due to the combination of the oxidizer and iron catalyst.

In an embodiment, the oilfield waste water is a product of injecting water downhole or is formation water that flows from the formation to the surface. Exemplary oilfield waste water includes produced water, flowback water, and the like, or a combination comprising at least one of the foregoing. Produced water typically is water that flows to the surface during production of oil and gas from a subterranean hydrocarbon source. Flowback water, on the other hand, generally is water that flows to the surface after performing a hydraulic fracturing job. The oilfield waste water (e.g., produced water or flowback water) contains a plurality of neutral and ionic species that include the elements aluminum, antimony, arsenic, barium, boron, cadmium, calcium, carbon, chlorine, chromium, cobalt, copper, gallium, germanium, hafnium, indium, iron, lanthanum, lead, magnesium, manganese, mercury, molybdenum, nickel, niobium, potassium, phosphorus, radium, selenium, silicon, silver, sodium, strontium, sulfur, tantalum, tellurium, thallium, tin, titanium, tungsten, vanadium, zinc, zirconium, or a combination thereof. In an embodiment, these elements are present as an ionic species that are hydrated, complexed, combined with another species, or a combination thereof. The oilfield waste water also includes polyatomic species such as $SO_4^{2-}$, $HCO_3^-$, $CO_3^{2-}$, $H_2S$, and the like as well as other components, including oil, grease, and dissolved solids. The concentration of these species changes from source to source and also varies in time, even from the same source (e.g., the same well).

The oxidizer in conjunction with the catalyst oxidizes the sulfide in the oilfield waste water to sulfate. In an embodiment, the oxidizer includes, for example, inorganic and organic compounds such as halogen oxidizers (e.g., chlorine dioxide, chlorine gas, sodium hypochlorite, hypobromous acids, chlorates such as $KClO_3$, and the like), oxygen oxidizers (e.g., peroxy acids, ozone, oxygen, permanganate, and the like), peroxides (e.g., hydrogen peroxide, calcium peroxide, magnesium peroxide, ketone peroxides, diacyl peroxides, diakyl peroxides, peroxyesters, peroxyketals, hydroperoxides, peroxydicarbonates, and peroxymonocarbonates, and the like), nitrates (e.g., $R(NO_3)_x$), nitrites (e.g., $RNO_2$), dichromates (e.g., potassium dichromate), and combinations thereof. Exemplary oxidizers also include peroxydisulfate salts, persulfate salts, acetylacetone peroxide, methylethylketone peroxide, cyclohexanone peroxide, methylisobutylketone peroxide; benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; tert-butyl peroxide-2-ethyl hexanoate; 1,1-ditert-butylperoxy-3,3,5-trimethyl cyclohexane, 1,3-bis(tert-butylperoxyisopropyl)benzene, and the like.

In some embodiments, the oxidizer is a nitrogen-chloro oxidizer that contains a nitrogen-chlorine bond that is readily released in the oilfield waste water. Exemplary nitrogen-chloro oxidizers are inorganic and organic chloramines ($R_2NCl$, wherein R is independently hydrogen, alkyl, alkylene, and the like) and chlorinated triazine or a derivative thereof that oxidizes sulfide to water soluble sulfate. Such compounds include, e.g., chlorinated oxytriazines, hydroxytriazines, melamines, guanamines, halotriazines, haloalkyltriazines, cyaphenine, and the like. An exemplary compound is trichloro-s-triazinetrione.

The iron catalyst includes an iron salt, iron complex, or a combination comprising at least one of the foregoing. In the iron salt, the iron is a ferrous ion, ferric ion, or a combination thereof. The counter ion is a monatomic or polyatomic anion such as sulfate, chloride, nitrate, and the like. Exemplary iron catalysts are ferrous sulfate, ferric sulfate, ferric chloride, ferrous gluconate, ferric nitrate, iron (III) hydroxide oxide [FeO(OH)], ferrous chloride, ferrous iodide, iron sulfide, iron 4-cyclohexyl-butyrate, ferric oxide, ferric bromide, ferrous fluoride, iron powder, ferrous acetate, ferrous oxalate, ferric oxalate, and the like. Further exemplary iron catalysts include ferric hypophosphite, ferric albuminate, ferric citrate, ferric oxide saccharate, ferric ammonium citrate, ferrous lactate, ferrous fumarate, heme, ferric trisglycinate, ferrous bisglycinate, ferric nitrate, ferrous hydroxide saccharate, ferric gluconate, ferric aspartate, ferrous sulfate heptahydrate, ferrous phosphate, ferric ascorbate, ferrous formate, ferrous acetate, ferrous malate, ferrous glutamate, ferrous cholinisocitrate, ferroglycine sulfate, ferric oxide hydrate, ferric pyrophosphate soluble, ferric hydroxide saccharate, ferric manganese saccharate, ferric subsulfate, ferric ammonium sulfate, ferrous ammonium sulfate, ferric sesquichloride, ferric choline citrate, ferric manganese citrate, ferric quinine citrate, ferric sodium citrate, ferric sodium edetate, ferric formate, ferric ammonium oxalate, ferric potassium oxalate, ferric sodium oxalate, ferric peptonate, ferric manganese peptonate, ferric acetate, ferric fluoride, ferric phosphate, ferric pyrophosphate, ferrous pyrophosphate, ferrous carbonate saccharated, ferrous carbonate mass, ferrous succinate, ferrous citrate, ferrous tartrate, ferric fumarate, ferric succinate, ferrous hydroxide, ferrous nitrate, ferrous carbonate, ferric sodium pyrophosphate, ferric tartrate, ferric potassium tartrate, ferric subcarbonate, ferric glycerophosphate, ferric saccharate, ferric hydroxide saccharate, ferric manganese saccharate, and ferrous ammonium sulfate, ferric sodium pyrophosphate, ferrous carbonate, ferric hydroxide, ferrous oxide, ferric oxyhydroxide, elemental iron (in any form including powder, flake, turnings, grains, and the like), and the like.

Iron complexes include, e.g., polysaccharide-iron complex, methylidine-iron complex, ethylenediaminetetraacetic acid (EDTA)-iron complex, phenanthrolene iron complex, p-toluidine iron complex, ferrous saccharate complex, ferrlecit, ferrous gluconate complex, ferrum vitis, ferrous hydroxide, saccharate complex, iron-arene sandwich complexes, acetylacetone iron complex salt, iron-dextran complex, iron-dextrin complex, iron-sorbitol-citric acid complex, saccharated iron oxide, ferrous fumarate complex, iron porphyrin complex, iron phtalocyamine complex, iron cyclam complex, dithiocarboxy-iron complex, desferrioxamine-iron complex, bleomycin-iron complex, ferrozine-iron complex, iron perhaloporphyrin complex, alkylenediamine-N,N-disuccinic acid iron(III) complex, hydroxypyridone-iron(III) complex, aminoglycoside-iron complex, transferrin-iron complex, iron thiocyanate complex, iron complex cyanides, porphyrinato iron(III) complex, polyaminopolycarbonate iron complexes, dithiocarbamate iron complex, adriamycin iron complex, anthracycline-iron complex, N-methyl-D-glucamine-dithiocarbamate (MGD)-iron complex, ferrioxamine B, ferrous citrate complex, ferrous sulfate complex, ferric, gluconate complex, ferrous succinate, complex, polygluocopyranosyl iron complex, polyaminodisuccinic acid iron complex, biliverdin-iron complex, deferiprone iron complex, ferric oxyhydride-dextran complex, dinitrosyl dithiolato iron complex, iron lactoferrin complexes, 1,3-ethylenediaminetetraacetic acid (EDTA) ferric complex salts, diethylenetriaminepentaacetic acid iron complex salts, cyclohexanediaminetetraacetic acid iron complex salts, methyliminodiacetic acid iron complex salts, glycol ether diaminetetraacetic acid iron complex salts, ferric hydroxypyrone complexes, ferric succinate complex, ferric chloride complex, ferric glycine sulfate complex, ferric aspartate complex, sodium ferrous gluconate complex, ferrous hydroxide polymaltose complex, and the like.

As noted above, a coagulant or flocculant is added to clarify the oilfield waste water such as after oxidation and catalyzing formation of the sulfate. The coagulant is nonionic, cationic, anionic, or zwitterionic. Likewise, the flocculant is nonionic, cationic, anionic, or zwitterionic. In an embodiment, the coagulant or flocculant is selected based on an amount of shear force that occurs in the oilfield waste water, specifically, the coagulant is added when an appreciable shear is applied to oilfield waste water such as with active mixing (e.g., blending, stirring, swirling, spraying, and the like) whereas the flocculant is added to the oilfield waste water under a condition of low applied shear to the oilfield waste water. According to an embodiment, the coagulant and flocculant are disposed in the oilfield waste water separately or together.

In an embodiment, a cationic coagulant is an inorganic coagulant such as an aluminum compound (e.g., aluminum chloride). According to an embodiment, a cationic polymeric coagulant or flocculant is a polyethylene imine or polyamine (which is or is not fully quaternised), a dicyandiamide condensation polymer (which is substantially fully quaternised or in salt form), a polymer of water soluble ethylenically unsaturated monomer or monomer blend that is formed from 50 mole percent (mol %) to 100 mol % cationic monomer and from 0 mol % to 50 mol % of another monomer. Ethylenically unsaturated cationic monomers include dialkylaminoalkyl (meth)-acrylates and dialkylaminoalkyl (meth)-acrylamides (usually in quaternary or salt form), diallyl dialkyl ammonium chloride (e.g., diallyl dimethyl ammonium chloride (DADMAC), and the like. Cationic homopolymers or copolymers are useful. In an embodiment, the polymer is a copolymer, and the comonomer is acrylamide or another water soluble non-ionic ethylenically unsaturated monomer.

According to an embodiment, the cationic polymeric coagulant is a linear polymer. Alternatively, it is produced from multifunctional monomers or additives that produce a branched structure in the polymer backbone, for instance polyethylenically unsaturated monomers such as tetraallyl ammonium chloride, methylene bis acrylamide, and the like.

Nonionic coagulants or flocculants are prepared from nonionic monomers such as acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol)monomethyl ether mono(meth)acrylate, N-vinyl-2-pyrrolidone, glycerol mono((meth)acrylate), 2-hydroxyethyl(meth)acrylate, vinyl methylsulfone, vinyl acetate, and the like.

Zwitterionic coagulants of flocculants are prepared from monomers containing cationic and anionic functionality in equal charge proportions so that the zwitterionic polymer is net neutral. Exemplary zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-(2-sulfoethyl) ammonium betaine, and the like.

In an embodiment, the flocculant or coagulant is anionic and is an anionic polymer that includes repeat units that are anionic, cationic, neutral, or a combination thereof such that the polymer has a net negative charge. The repeat units are branched or linear. In an embodiment, the anionic polymer includes repeat units having various anionic functional groups (e.g., carboxylic acid, sulfonic acid, phosphoric acid, or a phosphonic acid functional group, specifically carboxylic acid radicals) alone or together with further polar radicals such as carboxamide radicals. Anionic copolymer flocculants or coagulants are obtained by copolymerizing an ethylenically unsaturated monomer having an anionic or anionizable side group (e.g., acrylic, methacrylic, vinylsulfonic, vinylphosphonic, itaconic and 2-acrylamidomethylpropanesulfonic acid, sulfopropyl acrylate and sulfopropyl methacrylate) with a nonionic comonomer (e.g., acrylamide, methacrylamide, N-vinylformamide, N-vinylacetamide, N-vinylmethylacetamide, N-vinylmethylformamide, vinyl acetate, vinylpyrrolidone, and the like). Further, anionic functional groups are introduced into the polymer by esterifying carboxyl groups with a polyol, such as ethanediol, and subjecting the remaining free hydroxyl groups to further reaction with, for example, sulfuric acid or phosphoric acid. In an embodiment, the anionic polymer includes acrylamide and acrylic acid prepared by polymerization of acrylamide and acrylic acid or through hydrolysis of polyacrylamide, e.g., partially hydrolyzed polyacrylamide.

Exemplary monomer units that are polymerized to form the anionic polymer are acrylamide, (meth)acrylamide, 2-acrylamido-2-methylpropane sulphonic acid, acrylamido propyltrimethyl ammonium chloride, acrylic acid, acrylic acid esters, dimethydiallylammonium chloride, dimethylaminoethyl acrylate, dimethylaminoethyl methacrylate, isopropyl acrylamide, polyethylene glycol methacrylate, itaconic acid, methacrylamido propyltrimethyl ammonium chloride, methacrylic acid, methacrylic acid esters, N-vinyl acetamide, N-vinyl formamide N-vinyl pyrrolidone, N-vinylimidazole, N-vinylpyridine, vinyl sulfonic acid, N,N-dimethylacrylamide, tert-butyl acrylamide, poly(ethylene glycol) methyl ether acrylate, poly(propylene glycol) methyl ether acrylate, poly(ethylene glycol) acrylate, undecanoic acid, lauryl acrylate, (3-acrylamidopropyl)trimethylammonium chloride, N-(hydroxymethyl)acrylamide, N-(hydroxyethyl)acrylamide, 2-acrylamidoglycolic acid, 3-acryloylamino-1-propanol, N-(isobutoxymethyl)acrylamide, N-[tris(hydroxymethyl)methyl]acrylamide, N-phenylacrylamide, 2-(diethylamino)ethyl acrylate, 2-ethylhexyl acrylate, 2-hydroxyethyl acrylate, 3-(dimethylamino)propyl acrylate, 4-hydroxybutyl acrylate, di(ethylene glycol) 2-ethylhexyl ether acrylate, [2-(acryloyloxy)ethyl]trimethylammonium chloride, sodium acrylate, 2-(diethylamino)ethyl methacrylate, 2-(dimethylamino)ethyl methacrylate, 2-butoxyethyl methacrylate, 3-(acryloyloxy)-2-hydroxypropyl methacrylate, and the like. In a particular embodiment, the anionic polymer is made by copolymerizing (meth)acrylamide and (meth)acrylic acid.

Examples of anionic polymers include polyacrylic acid, polyacrylates, poly((meth) acrylates), acrylamide/sodium acrylate copolymers, acrylamide/sodium (meth) acrylate copolymers, acrylamide/acrylamidomethyl propone sulfonic acid copolymers, terpolymers of acrylamide/acrylamidomethyl propone sulfonic acid/sodium acrylate, and the like. According to an embodiment, the anionic polymer is a copolymer comprising acrylamide and acrylic acid (or an acrylate salt). In an embodiment, the flocculant is a copolymer that includes acrylamide and acrylate repeat units. Such a flocculant copolymer is available under the trade name SPECTRAFLOC 875 (an acrylate/acrylamide copolymer) from Baker Hughes Inc. or the trade name TRAMFLOC 100-199 (an acrylate/acrylamide copolymer) from Tramfloc Inc.

According to an embodiment, the acrylamide and acrylic acid are present in the anionic polymer in any relative amount. In some embodiments, the acrylamide is present in an amount from 5% to 95% and acrylic acid in an amount from 5% to 95%, based on the total moles of repeat units in the anionic polymer. A ratio of the anionic repeat units to nonionic and cationic repeat units in the anionic copolymer is greater than or equal to 0.1, specifically greater than or equal to 1, more specifically greater than or equal to 10, even more specifically greater than or equal to 100, yet more specifically greater than or equal to 1,000, and further specifically greater than or equal to 10,000, provided that the net charge of the anionic polymer is negative.

It is contemplated that the sulfide in the oilfield waste water is a number of different forms or species. In an embodiment, the sulfide includes an inorganic sulfide such as hydrogen sulfide ($H_2S$), bisulfide ($HS^-$), sulfide ion ($S^{2-}$), or a combination comprising at least one of the foregoing. The form and amount of the inorganic sulfide depends on pH. That is, hydrogen sulfide is a dominant species at an acidic pH (e.g., pH less than 6); bisulfide dominates at pH from 7 to 9, and sulfide ion ($S^{2-}$) has the greatest concentration at an alkaline pH greater than 9. According to an embodiment, the sulfide is a metal sulfide such as CdS, $Ag_2S$, and the like. In some embodiments, the sulfide is an alkali metal sulfide such as $Li_2S$, NO, $K_2S$, and the like. In an embodiment, the sulfide is an organic sulfide such as a thioether, thiol, and the like.

In an embodiment, an additive is added to the oilfield waste water after oxidation of the sulfide to sulfate in forming a recycled water that is useful as a hydraulic fracturing fluid or in enhanced oil production methods. The additive includes an acid (e.g., a mineral acid or organic acid), a biocide, a polymer, a breaker, a clay stabilizer, a corrosion inhibitor, a crosslinker, a friction reducer, a gelling agent, an iron control agent, a lubricant, a non-emulsifier, a pH-adjusting agent, a scale inhibitor, a surfactant, a proppant, or a combination comprising at least one of the foregoing. Such additives are thought to, for example, facilitate entry into rock formations, kill bacteria and reduce the risk of fouling, stabilize clay, provide well maintenance, facilitate proppant entry, improve surface pressure, provide proppant placement, prevent precipitation, and reduce fluid tension of the composition.

Useful surfactants include fatty acids of up to 22 carbon atoms such as stearic acids and esters and polyesters thereof, poly(alkylene glycols) such as poly(ethylene oxide), poly(propylene oxide), and block and random poly(ethylene oxide-propylene oxide) copolymers such as those marketed under the trademark PLURONIC by BASF. Other surfactants include polysiloxanes, such as homopolymers or copolymers of poly(dimethylsiloxane), including those having functionalized end groups, and the like. Other useful surfactants include those having a polymeric dispersant having poly(alkylene glycol) side chains, fatty acids, or fluorinated groups such as perfluorinated $C_{1-4}$ sulfonic acids grafted to the polymer backbone. Polymer backbones include those based on a polyester, a poly(meth)acrylate, a polystyrene, a poly(styrene-(meth)acrylate), a polycarbonate, a polyamide, a polyimide, a polyurethane, a polyvinyl alcohol, or a copolymer comprising at least one of these polymeric backbones. Additionally, the surfactant is anionic, cationic, zwitterionic, or non-ionic.

Exemplary cationic surfactants include but are not limited to alkyl primary, secondary, and tertiary amines, alkanolamides, quaternary ammonium salts, alkylated imidazolium, and pyridinium salts. Additional examples of the cationic surfactant include primary to tertiary alkylamine salts such as, e.g., monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy)methylammonium chloride; alkylpyridinium salts such as, e.g., N-cetylpyridinium chloride, N-stearylpyridinium chloride; N,N-dialkylmorpholinium salts; fatty acid amide salts such as, e.g., polyethylene polyamine; and the like.

Exemplary anionic surfactants include alkyl sulfates, alkyl sulfonates, fatty acids, sulfosuccinates, and phosphates. Examples of an anionic surfactant include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

In an embodiment, the nonionic surfactant is, e.g., an ethoxylated fatty alcohols, alkyl phenol polyethoxylates, fatty acid esters, glycerol esters, glycol esters, polyethers, alkyl polyglycosides, amineoxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol monononyl ethers); glucoside alkyl ethers (e.g., decyl glucoside, lauryl glucoside, octyl glucoside); polyoxyethylene glycol octylphenol ethers (e.g., TRITON X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name PLURONICS, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, e.g., betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3^-]$, where R is an alkyl group). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n+1}N^+(CH_2C_6H_5)(CH_3)CH_2CH_2SO_3^-]$.

In an embodiment, the non-emulsifier of the additive is a combination of the above surfactants or a combination of surfactant with a short chain alcohol or polyol such as lauryl sulfate with isopropanol or ethylene glycol. The non-emulsifier prevents formation of emulsions in the recycled water, e.g., hydraulic fracturing fluid.

In an embodiment, the additive is the lubricant such as a polyacrylamide, petroleum distillate, hydrotreated light petroleum distillate, a short chain alcohol (e.g., methanol), or polyol (e.g., ethylene glycol). Such lubricants minimize friction and also include, e.g., a polymer such as polyacrylamide, polyisobutyl methacrylate, polymethyl methacrylate, or polyisobutylene as well as water-soluble lubricants such as guar, guar derivatives, polyacrylamide, and polyethylene oxide.

The clay stabilizer of the additive prevents the clay downhole from swelling under contact with the recycled water (e.g., hydraulic fracturing fluid) or applied fracturing pressure. In an embodiment, the clay stabilizer includes a quaternary amine, a brine (e.g., KCl brine), choline chloride, tetramethyl ammonium chloride, and the like.

According to an embodiment, the additive is the pH-adjusting agent, which adjusts the pH of the recycled water. The pH-adjusting agent is an organic or inorganic base, organic or inorganic acid, or a buffer, which is any appropriate combination of acid and conjugate base. Exemplary inorganic bases include those represented by MOH, where M is a metal from group 1 or 2 of the periodic table, a transition metal, or a metal or metalloid from group 13, 14, or 15; carbonate salt; bicarbonate salt; or a combination thereof. Exemplary inorganic acids include HCl, HBr, fluoroboric acid, sulfuric acid, nitric acid, acetic acid, formic acid, methanesulfonic acid, propionic acid, chloroacetic or dichloroacetic acid, citric acid, glycolic acid, lactic acid, or a combination thereof. In an embodiment, the pH-adjusting agent is selected to impart favorable characteristics to the recycled water, particularly the hydraulic fracturing fluid. In an embodiment, the pH-adjusting agent is selected to avoid damage to the surface equipment or to avoid damaging the wellbore or subterranean formation.

In an embodiment, the additive is the biocide that prevents injection of a microbe (e.g., bacteria) downhole. The biocide kills, eliminates, or reduces bacteria in the recycled water including additional added water (e.g., when using river water to include in the recycled water). In this way, introduction of live bacteria into the formation is prevented, thus reducing production of, e.g., sour gas.

According to an embodiment, the biocide does not interfere with the other components of a recycled water formed by treating the oilfield waste water and is not a health risk. In an embodiment, the biocide is an aldehyde such as glutaraldehyde. Examples of the biocide include non-oxidizing and oxidizing biocides. Exemplary oxidizing biocides include hypochlorite bleach (e.g., calcium hypochlorite and lithium hypochlorite), peracetic acid, potassium monopersulfate, potassium peroxymonosulfate, bromochlorodimethylhydantoin, dichloroethylmethylhydantoin, chloroisocyanurate, trichloroisocyanuric acids, dichloroisocyanuric acids, chlorinated hydantoins, and the like. Additional oxidizing biocides include, e.g., bromine products like: stabilized sodium hypobromite, activated sodium bromide, or brominated hydantoins. Other oxidizing biocides include chlorine dioxide, ozone, inorganic persulfates such as ammonium persulfate, or peroxides, such as hydrogen peroxide and organic peroxides.

Exemplary non-oxidizing biocides include dibromonitfilopropionamide, thiocyanomethylthiobenzothlazole, methyldithiocarbamate, tetrahydrodimethylthladiazonethione, tributyltin oxide, bromonitropropanediol, bromonitrostyrene, methylene bisthiocyanate, chloromethylisothlazolone, methylisothiazolone, benzisothlazolone, dodecylguanidine hydrochloride, polyhexamethylene biguanide, tetrakis(hydroxymethyl) phosphonium sulfate, glutaraldehyde, alkyldimethylbenzyl ammonium chloride, didecyldimethylammonium chloride, poly[oxyethylene-(dimethyliminio) ethylene (dimethyliminio) ethylene dichloride], decylthioethanamine, terbuthylazine, and the like. Additional non-oxidizing biocides are quaternary ammonium salts, aldehydes, and quaternary phosphonium salts. In an embodiment, quaternary biocides have a fatty alkyl group and three methyl groups, but in the phosphonium salts, the methyl groups, e.g., are substituted by hydroxymethyl groups without substantially affecting the biocidal activity. In an embodiment, they also are substituted with an aryl group. Examples include formaldehyde, glyoxal, furfural, acrolein, methacrolein, propionaldehyde, acetaldehyde, crotonaldehyde, pyridinium biocides, benzalkonium chloride, cetrimide, cetyl trimethyl ammonium chloride, benzethonium chloride, cetylpyridinium chloride, chlorphenoctium amsonate, dequalinium acetate, dequalinium chloride, domiphen bromide, laurolinium acetate, methylbenzethonium chloride, myristyl-gamma-picolinium chloride, ortaphonium chloride, triclobisonium chloride, alkyl dimethyl benzyl ammonium chloride, cocodiamine, dazomet, 1-(3-chloroallyl)-chloride.3,5,7-triaza-1-azoniaadamantane, or a combination thereof.

In an embodiment, the biocide is encapsulated or coated by any suitable encapsulation method using any suitable encapsulation material. The encapsulation material is any material that does not adversely interact or chemically react with the biocide to destroy its utility. In an embodiment, the biocide is released from the coating at a selected time.

In an embodiment, the additive is hydrochloric acid, glutaraldehyde, 2,2-dibromo-3-nitrilopropionamide, peroxodisulfates, salt (for example, tetramethylammonium chloride), methanol, potassium hydroxide, sodium acrylate, polyacrylamide, guar gum, citric acid, thioglycolic acid, ethylene glycol, polyacrylate, isopropanol, or a combination thereof.

According to an embodiment, the additive is a breaker such as a peroxide, a persulfate, a perphosphate, a perborate, a percarbonate, a persilicate, an oxyacid of a halogen, an oxyanion of halogen, a peracid, a derivative thereof, or a combination thereof. In some embodiments, the oxidizer and the breaker are the same or different.

In one embodiment, the breaker is a persulfate, such as sodium persulfate, ammonium persulfate, potassium persulfate, potassium peroxymonosulfate (Caro's acid), or a combination thereof. The breaker is, e.g., an oxyacid or oxyanion of halogen, for instance, hypochlorous acid, a hypochlorite, chlorous acid and chlorites, chloric acid and chlorates, perchloric acid and perchlorate, a derivative thereof, or a combination thereof.

In an embodiment, a peroxide breaker has oxygen-oxygen single bonds in its molecular structure. The peroxide breaker is hydrogen peroxide or another material to provide peroxide or hydrogen peroxide so that the breaker has a breaking function, such as changing fluid viscosity. Metal peroxides such as sodium peroxide, calcium peroxide, zinc peroxide, magnesium peroxide, or other peroxides such as superoxides, organic peroxides, and the like can be used.

Additionally, in an embodiment, the peroxide breaker is a stabilized peroxide breaker with the hydrogen peroxide bound, inhibited, or the like by another compound or molecule prior to contact with, e.g., an aqueous fluid such as water such that it forms or releases hydrogen peroxide when contacted by the aqueous fluid. Exemplary stabilized peroxide breakers include an adduct of hydrogen peroxide with another molecule and include carbamide peroxide or urea peroxide $(C(\!\!=\!\!O)(NH2)_2.H_2O_2)$, a percarbonate (e.g., sodium percarbonate $(2Na_2CO_3.3H_2O_2)$, potassium percarbonate, ammonium percarbonate, and the like), and the like. The stabilized peroxide breakers also include compounds that undergo hydrolysis in water to release hydrogen peroxide, e.g., sodium perborate. In an embodiment, hydrogen peroxide stabilized with appropriate surfactants also is used as the stabilized peroxide breaker.

According to an embodiment, the breaker is the peracid, e.g., peracetic acid, perbenzoic acid, a derivative thereof, or a combination thereof. Additionally, a variety of peroxycarboxylic acids is employed as the peracid breaker. The peroxycarboxylic acid includes an ester peroxycarboxylic acid, an alkyl ester peroxycarboxylic acid, a sulfoperoxycarboxylic acid, or a combination thereof. Peroxycarboxylic acid (or percarboxylic acid) are acids having a general formula $R(CO_3H)_n$. In an embodiment, the R group is saturated or unsaturated as well as substituted or unsubstituted. As described herein, R is an alkyl, alkenyl, arylalkyl, arylalkenyl, cycloalkyl, cycloalkenyl, aromatic, heterocyclic, or ester group, or a combination thereof (e.g., an alkyl ester group), with n being 1, 2, or 3. Exemplary ester groups include aliphatic ester groups, such as $R^1OC(O)R^2$, where $R^1$ and $R^2$ independently are a group (e.g., an alkyl group) described above for R such that $R^1$ and $R^2$ are, e.g., independently small carbon chain alkyl groups, such as a $C_1$-$C_5$ alkyl group.

One skilled in the art will appreciate that peroxycarboxylic acids may not be as stable as carboxylic acids, and their stability may increase with increasing molecular weight. Thermal decomposition of the peracids proceeds by, e.g., free radical and nonradical paths, by photodecomposition or radical-induced decomposition, or by the action of metal ions or complexes. In an embodiment, the percarboxylic acid peracids are made by direct, acid catalyzed equilibrium action of hydrogen peroxide with a carboxylic acid, by autoxidation of aldehydes, or from acid chlorides, and hydrides, or carboxylic anhydrides with hydrogen or sodium peroxide.

Exemplary peroxycarboxylic acids include peroxyformic, peroxyacetic, peroxypropionic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxycitric, peroxymaleic, peroxyascorbic, peroxyhydroxyacetic (peroxyglycolic), peroxyoxalic, peroxymalonic, peroxysuccinic, peroxyglutaric, peroxyadipic, peroxypimelic, peroxysuberic, peroxysebacic acid, and the like.

In an embodiment, the peracid includes a combination of several peroxycarboxylic acids. According to one embodiment, the composition includes a $C_2$-$C_4$ peroxycarboxylic acid, a $C_8$-$C_{12}$ peroxycarboxylic acid, an ester peroxycarboxylic acid, an alkyl ester peroxycarboxylic acids, or a mono- or di-peroxycarboxylic acid having up to 12 carbon atoms, and more specifically 2 to 12 carbon atoms. In an embodiment, the peroxycarboxylic acid includes peroxyacetic acid (POAA) (i.e., peracetic acid having the formula $CH_3COOOH$) or peroxyoctanoic acid (POOA) (i.e., peroctanoic acid having the formula, e.g., of n-peroxyoctanoic acid: $CH_3(CH_2)_6COOOH$).

In an embodiment, the peracid is an ester peroxycarboxylic acid. As used herein, ester peroxycarboxylic acid refers to a molecule having the formula:

wherein $R^1$ and $R^2$ are independently an organic group (e.g., alkyl, linear or cyclic, aromatic or saturated) or a substituted organic group (e.g., with a heteroatom or organic group). In an embodiment, the ester peroxycarboxylic acid is made by employing methods used for making peroxycarboxylic acid such as combining the corresponding ester carboxylic acid with an oxidizing agent, e.g., hydrogen peroxide.

Exemplary alkyl esterperoxycarboxylic acids include monomethyl monoperoxyglutaric acid, monomethyl monoperoxyadipic acid, monomethyl monoperoxyoxalic acid, monomethyl monoperoxymalonic acid, monomethyl monoperoxysuccinic acid, monomethyl monoperoxypimelic acid, monomethyl monoperoxysuberic acid, monomethyl monoperoxysebacic acid; mono ethyl monoperoxyoxalic acid, monoethyl monoperoxymalonic acid, monoethyl monoperoxysuccinic acid, monoethyl monoperoxyglutaric acid, monoethyl monoperoxyadipic acid, monoethyl monoperoxypimelic acid, monoethyl monoperoxysuberic acid, monoethyl monoperoxysebacic acid; monopropyl monoperoxyoxalic acid, monopropyl monoperoxymalonic acid, monopropyl monoperoxysuccinic acid, monopropyl monoperoxyglutaric acid, monopropyl monoperoxyadipic acid, monopropyl monoperoxypimelic acid, monopropyl monoperoxysuberic acid, monopropyl monoperoxysebacic acid, in which propyl is n- or isopropyl; monobutyl monoperoxyoxalic acid, monobutyl monoperoxymalonic acid, monobutyl monoperoxysuccinic acid, monobutyl monoperoxyglutaric acid, monobutyl monoperoxyadipic acid, monobutyl monoperoxypimelic acid, monobutyl monoperoxysuberic acid, monobutyl monoperoxysebacic acid, in which butyl is n-, iso-, or t-butyl; and the like.

In some embodiments, the peracid breaker is a sulfoperoxycarboxylic acid. Sulfoperoxycarboxylic acids, which also are referred to as sulfonated peracids, include the peroxycarboxylic acid form of a sulfonated carboxylic acid. In some embodiments, the sulfonated peracid is a mid-chain sulfonated peracid, i.e., a peracid that includes a sulfonate group attached to a carbon that is at least one carbon (e.g., at least the three position) from the carbon of the percarboxylic acid group in the carbon backbone of the percarboxylic acid chain, wherein the at least one carbon is not in the terminal position. As used herein, the term "terminal position" refers to the carbon on the carbon backbone chain of a percarboxylic acid that is furthest from the percarboxyl group. Thus, in an embodiment, sulfoperoxycarboxylic acid has the following formula:

wherein $R^3$ is hydrogen or a substituted or unsubstituted alkyl group; $R^4$ is a substituted or unsubstituted alkyl group; X is hydrogen, a cationic group, or an ester forming moiety; or salts or esters thereof.

In some embodiments, $R^3$ is a substituted or unsubstituted $C_m$ alkyl group; X is hydrogen, a cationic group, or an ester forming moiety; $R^4$ is a substituted or unsubstituted $C_n$ alkyl group; m=1 to 10; n=1 to 10; and m+n is less than 18; or salts, esters, or a combination thereof. In some embodiments, $R^3$ is hydrogen. In other embodiments, $R^3$ is a substituted or unsubstituted alkyl group. In some embodiments, $R^3$ is a substituted or unsubstituted alkyl group that does not include a cycloalkyl group. In some embodiments, $R^3$ is a substituted alkyl group. In some embodiments, $R^3$ is an unsubstituted $C_1$-$C_9$ alkyl group. In some embodiments, $R^3$ is an unsubstituted $C_7$ or $C_8$ alkyl. In other embodiments, $R^3$ is a substituted $C_8$-$C_{10}$ alkyl group. In some embodiments, $R^3$ is a substituted $C_8$-$C_{10}$ alkyl group and is substituted with at least 1, or at least 2 hydroxyl groups. In still yet other embodiments, $R^3$ is a substituted $C_1$-$C_9$ alkyl group. In some embodiments, $R^3$, is a substituted $C_1$-$C_9$ substituted alkyl group and is substituted with an —$SO_3H$ group. In other embodiments, $R^3$ is a $C_9$-$C_{10}$ substituted alkyl group. In some embodiments, $R^3$ is a substituted $C_9$-$C_{10}$ alkyl group wherein at least two of the carbons on the carbon backbone form a heterocyclic group. In some embodiments, the heterocyclic group is an epoxide group.

In an embodiment, $R^4$ is a substituted $C_1$-$C_{10}$ alkyl group. In some embodiments, $R^4$ is a substituted $C_8$-$C_{10}$ alkyl. In some embodiments, $R^4$ is an unsubstituted $C_6$-$C_9$ alkyl. In other embodiments, $R^4$ is a $C_8$-$C_{10}$ alkyl group substituted with at least one hydroxyl group. In some embodiments, $R^4$ is a $C_{10}$ alkyl group substituted with at least two hydroxyl groups. In other embodiments, $R^4$ is a $C_8$ alkyl group substituted with at least one —$SO_3H$ group. In some embodiments, $R^4$ is a substituted $C_9$ group, wherein at least two of the carbons on the carbon backbone form a heterocyclic group. In some embodiments, the heterocyclic group is an epoxide group. In some, embodiments, $R^4$ is a $C_8$-$C_9$ substituted or unsubstituted alkyl, and $R^4$ is a $C_7$-$C_8$ substituted or unsubstituted alkyl.

According to an embodiment, in the hydraulic fracturing fluid made by adding the additive to the recycled water formed by subjecting the oilfield waste water to the oxidizer and iron catalyst, the breaker is encapsulated in an encapsulating material to prevent the breaker from being dispersed and contacting other components of the recycled water until a predetermined time such as after proppant placement or after fracturing has occurred. The encapsulating material is configured to release the breaker in response to a breaking condition (e.g., time, pressure, temperature, solvent contact, contact with an activator, and the like). The breaker is a solid or liquid. As a solid, the breaker is, e.g., a crystalline or granular material. In an embodiment, the solid is encapsulated or provided with a coating to delay its release or contact with other fracturing fluid components. Encapsulating materials are polymers or compounds that adhere well to molecules of the breaker. Methods of disposing the encapsulating material on the breaker are discussed in relation to the proppant. In an embodiment, a liquid breaker is dissolved in an aqueous solution or another suitable solvent.

In an embodiment, the encapsulation material is a polymer that releases the breaker in a controllable way, e.g., at a controlled rate or concentration. Such material is a polymer that degrades over a period of time to release the breaker and is chosen depending on the release rate desired. Degradation of the polymer of the encapsulation material polymer occurs, e.g., by hydrolysis, solvolysis, melting, and the like. In an embodiment, the polymer of the encapsulation material is a homopolymer or copolymer of glycolate and lactate, a polycarbonate, a polyanhydride, a polyorthoester, a polyphosphacene, or a combination thereof.

According to an embodiment, the encapsulated breaker is an encapsulated hydrogen peroxide, encapsulated metal peroxides (e.g., sodium peroxide, calcium peroxide, zinc peroxide, and the like) or any of the peracids or other breaker herein.

In an embodiment, the recycled water also includes a secondary fluid. The secondary fluid is an aqueous liquid that includes water, brine, mineral acid, organic acid, or a combination comprising at least one of the foregoing. The brine is, for example, seawater, produced water, completion brine, or a combination thereof. The properties of the brine can depend on the identity and components of the brine. Seawater, as an example, contains numerous constituents such as bromine and trace metals, beyond typical halide-containing salts. In addition to the naturally occurring brines, completion brine is synthesized from fresh water by addition of various salts such as KCl, NaCl, $ZnCl_2$, $MgCl_2$, or $CaCl_2$ to increase the density of the brine, such as 10.6 pounds per gallon of $CaCl_2$ brine. Completion brines typically provide a hydrostatic pressure optimized to counter the reservoir pressures downhole. In an embodiment, the above brines are modified to include an additional salt. In an embodiment, the additional salt included in the brine is NaCl, KCl, NaBr, $MgCl_2$, $CaCl_2$, $CaBr_2$, $ZnBr_2$, $NH_4Cl$, sodium formate, cesium formate, and the like. The salt is present in the brine in an amount from about 0.5 weight percent (wt %) to about 50 wt %, specifically about 1 wt % to about 40 wt %, and more specifically about 1 wt % to about 25 wt %, based on the weight of the fluid.

According to an embodiment, the fluid is a mineral acid that includes hydrochloric acid, nitric acid, phosphoric acid, sulfuric acid, boric acid, hydrofluoric acid, hydrobromic acid, perchloric acid, or a combination comprising at least one of the foregoing. In some embodiments, the fluid is an organic acid that includes a carboxylic acid, sulfonic acid, or a combination thereof. Exemplary carboxylic acids include formic acid, acetic acid, chloroacetic acid, dichloroacetic acid, trichloroacetic acid, trifluoroacetic acid, proprionic acid, butyric acid, oxalic acid, benzoic acid, phthalic acid (including ortho-, meta- and para-isomers), and the like. Exemplary sulfonic acids include alkyl sulfonic acid or aryl sulfonic acid. Alkyl sulfonic acids include, e.g., methane sulfonic acid. Aryl sulfonic acids include, e.g., benzene sulfonic acid or toluene sulfonic acid. In one embodiment, the alkyl group may be branched or unbranched and contains from one to about 20 carbon atoms and is substituted or unsubstituted. In an embodiment, the aryl group is alkyl-substituted, i.e., is an alkylaryl group, or is attached to the sulfonic acid moiety via an alkylene group (i.e., an arylalkyl group). In an embodiment, the aryl group is substituted with a heteroatom. The aryl group has from 3 carbon atoms to 20 carbon atoms and includes, e.g., a polycyclic ring structure.

The proppant is particles (also referred to as proppant particles) that include a ceramic, sand, a mineral, a nut shell, gravel, glass, resinous particles, polymeric particles, or a combination thereof. In an embodiment, the proppant particles are selected depending on the particular application of the recycled water. Examples of the ceramic include an oxide-based ceramic, nitride-based ceramic, carbide-based ceramic, boride-based ceramic, silicide-based ceramic, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the proppant particles include, but are not limited to, Arizona sand, Wisconsin sand, Badger sand, Brady sand, and Ottawa sand. In an embodiment, the proppant particles are made of a mineral such as bauxite and are sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

Naturally occurring proppant particles include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

In an embodiment, the proppant particles are coated, e.g., with a resin. That is, individual proppant particles have a coating applied thereto. In this manner, if the proppant particles are compressed during or subsequent to, e.g., fracturing, at a pressure great enough to produce fine particles therefrom, the fine particles remain consolidated within the coating so they are not released into the formation. It is contemplated that fine particles decrease conduction of hydrocarbons (or other fluid) through fractures or pores in the fractures and are avoided by coating the proppant particles. Coating for the proppant particles include cured, partially cured, or uncured coatings of, e.g., a thermoset or thermoplastic resin. Curing the coating on the proppant particles occurs before or after disposal of the proppant particles in the recycled water or before or after disposal of the recycled water downhole, for example.

In an embodiment, the coating is an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In an embodiment, the curing agent for the coating is nitrogen-containing compounds such as amines and their derivatives; oxygen-containing compounds such as carboxylic acid terminated polyesters, anhydrides, phenol-formaldehyde resins, amino-formaldehyde resins, phenol, bisphenol A and cresol novolacs, phenolic-terminated epoxy resins; sulfur-containing compounds such as polysulfides, polymercaptans; and catalytic curing agents such as tertiary amines, Lewis acids, Lewis bases; or a combination thereof.

In an embodiment, the proppant particles include a crosslinked coating. The crosslinked coating typically provides crush strength, or resistance, for the proppant particles and prevents agglomeration of the proppant particles even under high pressure and temperature conditions. In some embodiments, the proppant particles have a curable coating, which cure subsurface, e.g. downhole or in a fracture. The curable coating cures under the high pressure and temperature conditions in the subsurface reservoir. Thus, the proppant particles having the curable coating are used for high pressure and temperature conditions.

According to an embodiment, the coating is disposed on the proppant particles by mixing in a vessel, e.g., a reactor. Individual components, e.g., the proppant particles and resin materials (e.g., reactive monomers used to form, e.g., an epoxy or polyamide coating) are combined in the vessel to form a reaction mixture and are agitated to mix the components. Further, the reaction mixture is heated at a temperature or at a pressure commensurate with forming the coating. In another embodiment, the coating is disposed on the particle via spraying such as by contacting the proppant particles with a spray of the coating material. The coated proppant particles are heated to induce crosslinking of the coating.

The aforementioned additive is added, e.g., to the recycled water formed from the oilfield waste water. Here, a composition that can be used to form the recycled water includes the oilfield waste water, the oxidizer, and the iron catalyst. An amount of each component is adjustable to achieve a selected amount of sulfide oxidation, e.g., 100% conversion to sulfate, during a selected time period or under select conditions.

Before oxidizing the sulfide to sulfate, the oilfield waste water has a high or low sulfide content. In an embodiment, the sulfide is present in the oilfield waste water in an amount greater than 5,000 parts per million (ppm), specifically greater than 1,000 ppm, more specifically greater than 500 ppm, yet more specifically greater than 100 ppm, and even more specifically greater than 50 ppm, based on a weight of the oilfield waste water. In some embodiments, the sulfide is present in the oilfield waste water in an amount from 1 ppm to 50 ppm, based on a weight of the oilfield waste water. The method herein is applicable to water that has a sulfide content that is less than 1 ppm, based on the weight of the water.

After oxidizing the sulfide to sulfate, the sulfide is present in an amount less than 1 ppm, specifically less than 500 parts per billion (ppb), more specifically less than 5 ppb, even more specifically less than 50 parts per trillion (ppt), and yet more specifically less than 1 ppt, based on a weight of the oilfield waste water. In an embodiment, the sulfide is quantitatively oxidized to, e.g., sulfate so that none of the sulfide remains in the oilfield waste water after oxidation by the oxidizer and catalyst.

To effect the oxidation of the sulfide in the oilfield waste water, the oxidizer is present in an amount from 1 ppm to 20,000 ppm, specifically 1 ppm to 1,000 ppm, based on a volume of the oxidizer added to the oilfield waste water. That is, in an embodiment, the oxidizer is present in a carrier that is added to the oilfield waste water such that the amount of oxidizer is present in the aforementioned amount in the carrier, based on the total volume of carrier and oxidizer, the carrier and oxidizer being referred to as oxidizer.

The flocculant is present in an amount from 5 ppm to 20,000 ppm, specifically 5 ppm to 10,000 ppm, more specifically 5 ppm to 1,000 ppm, and even more specifically 5 ppm to 200 ppm, based on the volume of the fluid. The iron catalyst is present in a trace amount to 5,000 ppm, more specifically 0.5 ppm to 50 ppm, based on the volume of the oilfield waste water. The additive is added to the recycled water in an amount from 0 wt % to 30 wt %, specifically 0 wt % to 10 wt %.

Upon oxidation of the sulfide, a precipitate is formed that includes sulfate or other insoluble compound in some embodiments. In an embodiment, no precipitate is formed. The precipitate is removed from the oilfield waste water by, e.g., addition of a coagulant or flocculant. In an embodiment, the coagulant or flocculant is added to the oilfield waste water coincidentally with the oxidizer such that, when the oxidizer is introduced into the oilfield waste water, the coagulant or flocculant is also present. In some embodiments, the coagulant or flocculant is introduced into the oilfield waste water before or after the oxidizer is added to the oilfield waste water. Thus, the oxidizer, coagulant, and flocculant are introduced in the oilfield waste water coincidentally or asynchronously. Thus, in a particular embodiment, the coagulant or flocculant is added to the oilfield waste water after formation of sulfate, i.e., after oxidation of the sulfide. Without wishing to be bound by theory, it is believed that the flocculant or coagulant accumulates a plurality of precipitate particles to form a large mass of insoluble material with respect to the water. In an embodiment, the flocculant bridges precipitate particles, resulting in more efficient settling. According to an embodiment, a precipitate aggregate is formed by adding the coagulant, flocculant, or combination thereof to the oilfield waste water. Therefore, the oilfield waste water is subjected to clarifying by contacting the oilfield waste water with a coagulant, a flocculant, or a combination comprising at least one of the foregoing.

To increase the amount of oxidation of the sulfide (including complete oxidation to sulfate) or aggregate precipitate formed and to decrease the time for oxidation or aggregate precipitate formation, the oxidizer, iron catalyst, flocculant, or coagulant are mixed with the oilfield waste water so that these components are distributed uniformly together. Such mixing increases the relative kinetic motion and collision rate of the components (e.g., any aggregate precipitate formed and the flocculant). Mixing includes static or dynamic mixing using elements such as contoured surfaces in the mixing environment, nozzles to inject the components, fans, blades, impellers, blenders, bubblers, injectors, and the like.

In an embodiment, motion in the environment is decreased or eliminated so that the aggregate precipitate forms efficiently. Moreover, the environment is made to be still in order to increase the size or amount of the aggregate precipitate particles.

The environment in which the oxidizer, iron catalyst, oilfield waste water, flocculant, coagulant, recycled water, or additive is combined is any number of structures for combining such materials. Exemplary environments include a container, vessel, pond, tank, pipe, tube, tubular, formation, Weir tank, separator, and the like. In an embodiment, the environment is open so that a surface of the oilfield waste water is exposed, enclosed, isolated, and the like. Applying pressure to the environment or decreasing a pressure of headspace above the oilfield waste water (or recycled water) is accomplished in an enclosed container. Such a container includes vents and piping or tube for delivery or removal of components (e.g. oxidizer, iron catalyst, oilfield waste water, flocculant, coagulant, recycled water, or additive) thereto.

Upon formation of the aggregate precipitate, it can be separated from the oilfield waste water by filtering the aggregate precipitate therefrom, centrifuging the aggregate precipitate and the oilfield waste water and collecting the oilfield waste water, skimming the aggregate precipitate from the oilfield waste water, or a combination thereof. Any number of ways to separate the aggregate precipitate from the oilfield waste water is used.

In an embodiment, after removal of the aggregate precipitate by separation from the oilfield waste water, the oilfield waste water is processed into recycled water for use as a hydraulic fracturing fluid, for usage in enhanced or improved oil recovery, for storage, or for disposal. Thus, the oilfield waste water is reclaimed after removal of the aggregate precipitate. In processing the oilfield waste water for use as a hydraulic fracturing fluid, additives are added to the fluid. Thereafter, the resulting hydraulic fracturing fluid is injected downhole for fracturing. In some embodiments, an aggregate precipitate is not formed, and the recycled water is made from the oilfield waste water after oxidation of the sulfide.

Thus, in an embodiment, a method for recycling oilfield waste water includes contacting oilfield waste water with an oxidizer in the presence of an iron catalyst, the oilfield waste water comprising sulfide; oxidizing the sulfide to sulfate; avoiding formation of a colloidal sulfur precipitate, a bulk sulfur precipitate, or a combination comprising at least one of the foregoing from oxidizing the sulfide or an oxidation product of the sulfide; clarifying the oilfield waste water by contacting the oilfield waste water with a flocculant to form an aggregate precipitate; separating the aggregate precipitate from the oilfield waste water to form a recycled water; combining an additive with the recycled water; and disposing the recycled water in a downhole environment.

In an embodiment, the liquid or solid is transferred from a container to another container as desired. In one embodiment, the oilfield waste water is combined with the oxidizer and iron catalyst in a first container and the resulting composition is transferred to a settling tank for removal of an aggregate precipitate. In some embodiments, the method is a dynamic flow method wherein contacting the oilfield waste water with the oxidizer comprises combining the oilfield waste water and the oxidizer in a flowing stream. According to an embodiment, contacting the oilfield waste water with the oxidizer comprises disposing the oilfield waste water and oxidizer together in a storage container. In a particular embodiment, the recycled water is disposed in a tank from which the recycled water is delivered to a well or a transport vessel.

The recycled water is any number of fluids useful in hydrocarbon and gas production and completion. In an embodiment, the recycled water is a hydraulic fracturing fluid comprising slickwater or a crosslink fluid. It is contemplated that the recycled water is useful as an enhanced oil recovery fluid.

In the recycle water, the sulfide is present in an amount less than 0.5 ppm. After oxidizing the sulfide to sulfate, the sulfide is present in an amount less than 1 ppm, specifically less than 500 ppb, more specifically less than 5 ppb, even more specifically less than 50 parts per trillion ppt, and yet more specifically less than 1 ppt, based on a weight of the recycled water. In an embodiment, the sulfide is quantitatively oxidized to, e.g., sulfate so that none of the sulfide is present in the recycled water.

The sulfate rapidly oxidizes the sulfide in the oilfield waste water. In an embodiment, oxidizing the sulfide to sulfate is complete in less than two days, specifically less than one day, more specifically less than 12 hours, even more specifically less than two hours, and yet even more specifically less than five minutes after contacting the oxidizer in the presence of the iron catalyst. The method herein can occur over a wide pH range. According to an embodiment, the method, and in particular, oxidizing sulfide to sulfate, occurs at every pH from 0 to 12, more specifically at an acidic pH, neutral pH, or alkaline pH.

The recycled water has beneficial properties. In an embodiment, the viscosity of the frac fluid developed from recycled water is great enough to suspend and transport the proppant and other additives at a temperature above the freezing point of water, specifically greater than 100 centipoise (cp), more specifically greater than 300 cp, more specifically greater than 400 cp, as measured, and even more specifically from 150 cp to 1,000 cp, as measured, for example, by a dual cup rotating viscometer at 26° C.

With respect to the hydraulic fracturing fluid, the proppant particles are present in an amount effective to prop open a fracture without the geometry of the fracture being altered during settling of the formation. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the recycled water. In an embodiment, the breaker is present in the recycled water in a mass concentration from 0 ppt to 20 ppt, specifically 0 ppt to 15 ppt, and more specifically, 0 ppt to 10 ppt, based on the total volume of the recycled water. In some embodiments, the biocide is present in an amount from 10 ppm to 2,000 ppm, specifically 50 ppm to 1,500 ppm, and more specifically 50 ppm to 1,000 ppm.

In an embodiment, combining the components of the recycled water is accomplished in a vessel such as a mixer, blender, and the like. In some embodiments, the recycled water is injected without mixing, e.g. it is injected "on the fly". The components are mixed, agitated, stirred, and the like. In an embodiment, the components are combined as the recycled water is being disposed downhole. The recycled water herein has advantageous properties that include suspending the proppant particles for an extended period of time or at an elevated temperature or pressure.

The processes herein for removal of sulfide from oilfield waste water and formation of recycled water are further illustrated by the following non-limiting examples.

Example 1. Sulfide Removal from Water Samples

Figure 1:
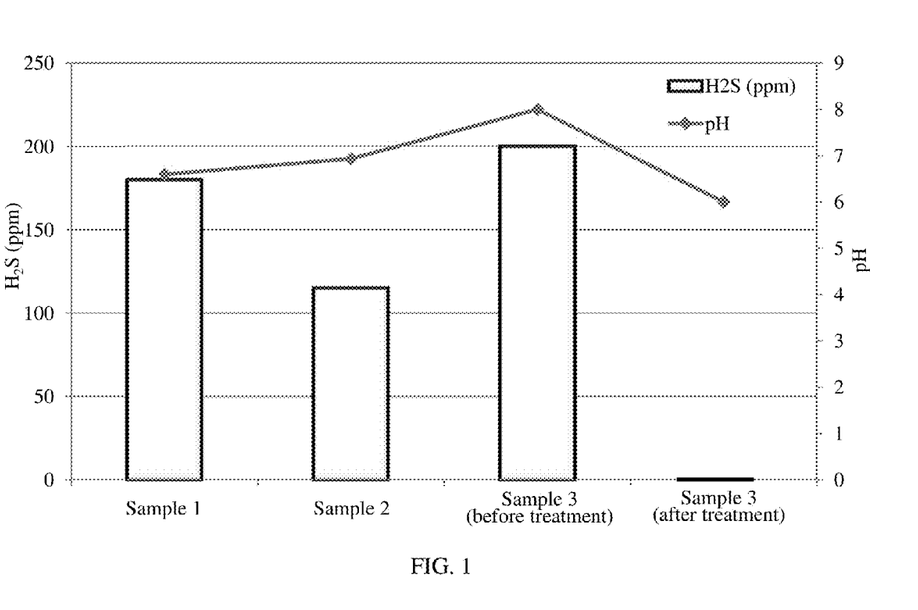
FIG. 1 shows a graph of the variation of hydrogen sulfide amount (in ppm) and pH for water samples that initially contain hydrogen sulfide.

Three samples of water containing various amounts of hydrogen sulfide were acquired. Sample 1, Sample 2, and Sample 3 were produced water from an oil well located in the United States. An aliquot of Sample 1, Sample 2, and Sample 3 was collected and subjected to chemical analysis to determine the amount of hydrogen sulfide present in the sample. The results appear as bars in FIG. 1, which shows the amount of hydrogen sulfide in ppm for Samples 1, 2, and 3 (before treatment). The pH of Samples 1, 2, and 3 also is shown in FIG. 1.

Figure 2:
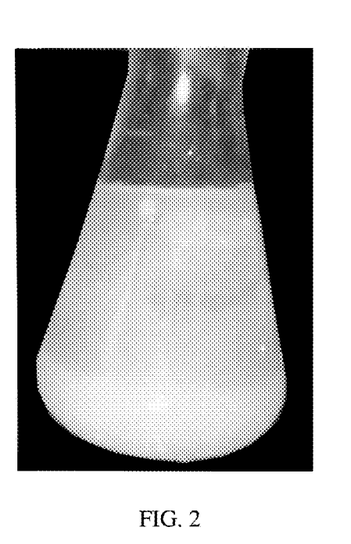
FIG. 2 shows a photograph of a sample of water that includes hydrogen sulfide in which a precipitate forms after addition of an oxidizer.

Thereafter, 350 ppm of chlorine dioxide was added to Sample 3. A colloidal precipitate of sulfur was formed as shown in FIG. 2. Sample 3 had a high degree of turbidity upon formation of the colloidal precipitate.

Since Sample 3 had the greatest amount of hydrogen sulfide at 200 ppm, it was used to test the efficacy of sulfide oxidation. Addition of 350 ppm of chlorine dioxide and 50 ppm of ferric sulfate caused oxidation of the sulfide and absolutely no hydrogen sulfide remained in Sample 3 upon this treatment. The result is shown in FIG. 1 as Sample 3 (after treatment). Thus, simple addition of chlorine dioxide without the iron catalyst produces copious amounts of colloidal precipitates of sulfur while a regimen of chlorine dioxide and ferric sulfate quantitatively eliminate hydrogen sulfide from produced water.

Figure 3:
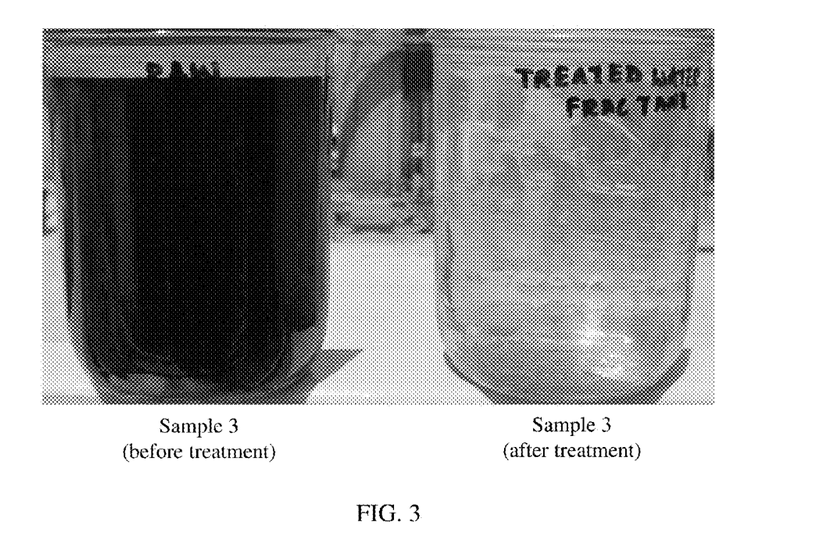
FIG. 3 shows a photograph of samples of water before and after treatment with an oxidizer and iron catalyst.

FIG. 3 illustrates the stark contrast between Sample 3 before treatment and Sample 3 after treatment. Before treatment, the produced water of Sample 3 was visually opaque and black colored due to the high level of sulfide present. After treatment with chlorine dioxide and ferric sulfate, Sample 3 (shown on the right in FIG. 3) was colorless and transparent with no light scattering due to lack of colloidal precipitates of sulfur being formed.

Figure 4:
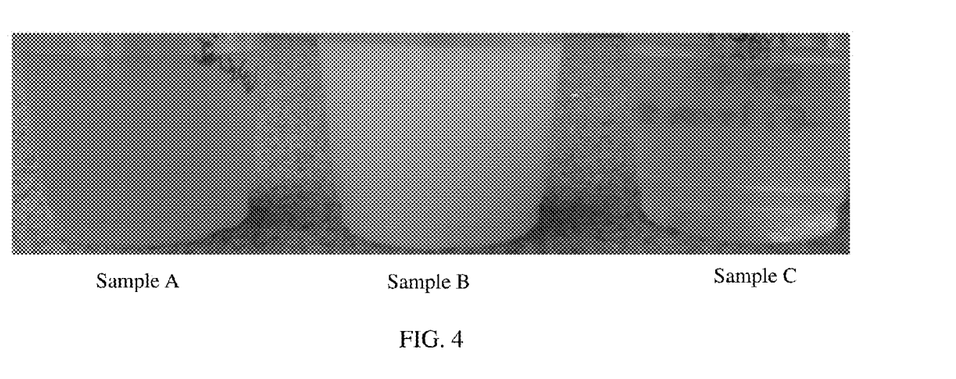
FIG. 4 shows a photograph of samples of water after addition of various reagents.

FIG. 4 shows the effect of various amounts of oxidizer and iron catalyst on aliquots of Sample 3. Sample A contained 50 mL of Sample 3 to which chlorine dioxide was added to achieve 100 ppm chlorine dioxide in the water. Sample A relieved much of the black color of pure Sample 3 but formed a milky, white precipitate. Sample B contained 50 mL of Sample 3 to which chlorine dioxide was added to achieve 350 ppm chlorine dioxide in the water. Sample B showed even more relief of the black color of pure Sample 3, but a greater amount of the milky, white precipitate occurred in comparison to Sample A. Finally, Sample C contained 50 mL of Sample 3 to which chlorine dioxide and ferric sulfate were added to achieve 350 ppm chlorine dioxide and 50 ppm ferric sulfate in the water. Sample C was colorless and devoid of the milky, white precipitate.

Example 2. Conversion of Produced Water to Fracturing Fluid

Figure 5:
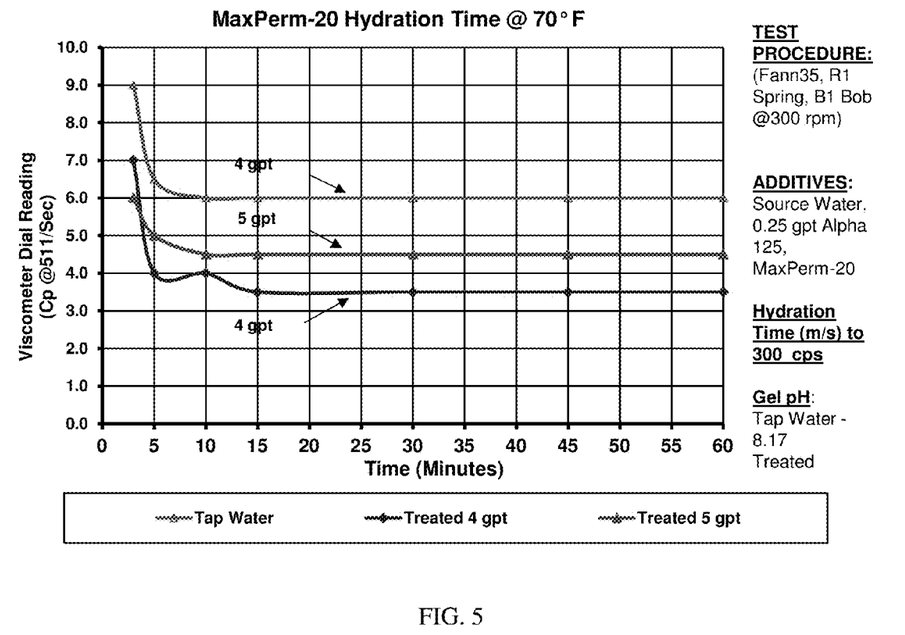
FIG. 5 shows a graph of viscosity versus time for an exemplary hydraulic fracturing fluid.

Produced water was acquired from a well. At room temperature, chlorine dioxide and ferric sulfate were added to the produced water to achieve 350 ppm chlorine dioxide and 50 ppm ferric sulfate in the produced water. The initial amount of hydrogen sulfide in the produced water was 200 ppm. Although the produced water was initially black and opaque similar to that of Sample 3 before treatment in FIG. 3, addition of the chlorine dioxide and ferric sulfate eliminated the sulfide from the produced water. After the produced water was treated to remove the hydrogen sulfide, Alpha 114 biocide and FRW-20 polymer were added to the treated water to prepare a fracturing fluid. FIG. 5 shows the hydration for this slick water fracturing fluid. FANN 35 was used with an R1 spring and a B1 bob at 500 rpm to generate the curve. A Comparison of the treated water with varying loading of the friction reducer with the tap water shows that the fluid hydrates well enough to the yield desired amount of friction reduction under real-world downhole conditions.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A method for reducing sulfide in oilfield waste water, the method comprising:
    contacting oilfield waste water with a combination of an oxidizer and an iron catalyst, the oilfield waste water comprising sulfide, the oxidizer comprising one or more of the following: a halogen oxidizer; a nitrate; a nitrite; a dichromate; or a nitrogen-chloro oxidizer; and the iron catalyst comprising an iron salt; the iron catalyst comprising one or more of the following: ferric sulfate; ferric chloride, or ferric nitrate;
    oxidizing the sulfide in the oilfield waste water to sulfate with the oxidizer in the presence of the iron catalyst to reduce the amount of the sulfide to less than 0.5 ppm, based on the weight of the oilfield waste water; and
    avoiding formation of elemental sulfur.

2. The method of claim 1, further comprising clarifying the oilfield waste water by contacting the oilfield waste water with a coagulant, a flocculant, or a combination thereof.

3. The method of claim 2, further comprising separating, from the oilfield waste water, an aggregate precipitate formed by the coagulant, the flocculant, or a combination thereof.

4. The method of claim 1, wherein contacting the oilfield waste water with the oxidizer comprises combining the oilfield waste water, the oxidizer, and the iron catalyst in a flowing stream.

5. The method of claim 1, wherein contacting the oilfield waste water with the oxidizer comprises disposing the oilfield waste water, the oxidizer, and the iron catalyst together in a storage container.

6. The method of claim 1, wherein the sulfide comprises one or more of the following: hydrogen sulfide; bisulfide; or sulfide ion.

7. The method of claim 1, wherein the sulfide oxidizer comprises chlorine dioxide.

8. The method of claim 1, wherein the oilfield waste water is produced water, flowback water, or a combination thereof.

9. The method of claim 1, wherein the oxidizer is present in an amount from 1 ppm to 20,000 ppm, based on a volume of the oxidizer added to the oilfield waste water.

10. The method of claim 1, wherein oxidizing the sulfide to sulfate is complete within five minutes after contacting the oxidizer in the presence of the iron catalyst.

11. The method of claim 1, wherein oxidizing sulfide to sulfate is carried out at a pH of from 0 to 12.

12. A method for recycling oilfield waste water, the method comprising:

contacting oilfield waste water with a combination of an oxidizer and an iron catalyst, the oilfield waste water comprising sulfide; the oxidizer comprising one or more of the following: a halogen oxidizer; a nitrate; a nitrite; a dichromate; or a nitrogen-chloro oxidizer, and the iron catalyst comprising an iron salt; the iron catalyst comprising one or more of the following: ferric sulfate; ferric chloride, or ferric nitrate;

oxidizing the sulfide in the oilfield waste water to sulfate with the oxidizer in the presence of the iron catalyst to reduce the amount of the sulfide to less than 0.5 ppm, based on the weight of the oilfield waste water;

avoiding formation of elemental sulfur;

clarifying the oilfield waste water by contacting the oilfield waste water with a flocculant to form an aggregate precipitate;

separating the aggregate precipitate from the oilfield waste water to form a recycled water;

combining an additive with the recycled water; and disposing the recycled water in a downhole environment.

13. The method of claim 12, wherein the recycled water is a hydraulic fracturing fluid comprising slickwater or a crosslink fluid; or an enhanced oil recovery fluid.

14. The method of claim 12, wherein the sulfide is present in the recycled water in an amount less than 0.5 ppm, based on a weight of the recycled water.

15. The method of claim 14, wherein, before oxidizing the sulfide, the sulfide is present in the oilfield waste water in an amount greater than 1,000 ppm, based on a weight of the oilfield waste water.

16. A method for reducing sulfide in oilfield waste water, the method comprising:

contacting oilfield waste water with a combination of chlorine dioxide and an iron catalyst, the oilfield waste water comprising sulfide, and the iron catalyst comprising ferric sulfate;

oxidizing the sulfide in the oilfield waste water to sulfate with the chlorine dioxide in the presence of the iron catalyst to reduce the amount of the sulfide to less than 0.5 ppm, based on the weight of the oilfield waste water; and avoiding formation of elemental sulfur;

wherein the catalyst is present in an amount of 0.5 ppm to 50 ppm based on the volume of the oilfield waste water.

17. The method of claim 16, wherein the oxidizing the sulfide to sulfate is complete within five minutes after contacting the oxidizer in the presence of the iron catalyst.

18. The method of claim 16, wherein the oilfield waste water is produced water, flowback water, or a combination thereof.

19. The method of claim 1, wherein the catalyst is present in an amount of 0.5 ppm to 50 ppm, based on the volume of the oilfield waste water.

\* \* \* \* \*